United States Patent [19]

Pedeutour et al.

[11] Patent Number: 5,706,866
[45] Date of Patent: Jan. 13, 1998

[54] PIPE MEMBER FOR BURIED CONDUIT WITH CORROSION PROTECTION AND PROCESS THEREFOR

[75] Inventors: Jean-Marc Pedeutour, Blenod-les-Pont-a-Mousson; Gerard Nouail, Metz; Jean Bello, Gezoncourt, all of France

[73] Assignee: Pont-A-Mousson S.A., Nancy, France

[21] Appl. No.: 516,063

[22] Filed: Aug. 17, 1995

Related U.S. Application Data

[63] Continuation of PCT/FR94/00181, Feb. 17, 1994.

[30] Foreign Application Priority Data

Feb. 18, 1993 [FR] France ............... 93/01862

[51] Int. Cl.$^6$ ............................................. F16L 55/00
[52] U.S. Cl. .................... 138/145; 138/143; 428/36.71; 428/632
[58] Field of Search ..................... 138/145, 146, 138/DIG. 6, 137, 139, 140, 143; 428/632, 36.91

[56] References Cited

U.S. PATENT DOCUMENTS

| | | |
|---|---|---|
| 4,853,297 | 8/1989 | Takahashi et al. .......... 138/146 X |
| 4,885,215 | 12/1989 | Yoshioka et al. .......... 428/632 |
| 5,126,210 | 6/1992 | Wieserman et al. .......... 428/469 |
| 5,151,308 | 9/1992 | Moskowitz et al. .......... 428/35.8 |
| 5,300,336 | 4/1994 | Wong et al. .......... 138/146 X |
| 5,356,679 | 10/1994 | Houis et al. .......... 138/146 X |

FOREIGN PATENT DOCUMENTS

| | | |
|---|---|---|
| 0151064 | 8/1985 | European Pat. Off. |
| 0209143 | 1/1987 | European Pat. Off. |
| 0485972 | 5/1992 | European Pat. Off. |
| 0508207 | 10/1992 | European Pat. Off. |
| 45552 | 4/1977 | Japan . |
| 265627 | 11/1988 | Japan . |
| 310357 | 12/1990 | Japan . |
| 2117414 | 10/1983 | United Kingdom . |

*Primary Examiner*—Patrick F. Brinson
*Attorney, Agent, or Firm*—Sughrue, Mion, Zinn, Macpeak & Seas, PLLC

[57] ABSTRACT

A cast iron piping system element has an outer coating comprising a first, inner porous layer consisting of zinc/aluminum alloy containing from 5 to 60% of aluminum, and a second, outer pore occluding layer of an organic or mineral binder in an aqueous, solvent or powder phase with a thickness of 100–140 μm.

17 Claims, No Drawings

PIPE MEMBER FOR BURIED CONDUIT WITH CORROSION PROTECTION AND PROCESS THEREFOR

This is a continuation of PCT/FR00181, Feb. 17, 1994.

BACKGROUND OF THE INVENTION

This invention relates to buried piping consisting of iron pipe members, particularly cast iron pipes. "Pipe member" refers to the individual pipes and various accessories such as elbows, couplings, etc.

Document JP-A-23010357 describes a known process for coating steel tubes, in which a sacrificial coating of zinc-aluminum alloy is spray-deposited, followed by a deposit of epoxy resin. Apparently, the resin coating is expected to be liquid-tight. This process applies to coatings for "drying space" tubes, and therefore certainly to open-air tubes of iron or steel.

Corrosion of ferrous metals by soils is a phenomenon of a different type from atmospheric corrosion. It essentially consists of the creation of oxidation regions electrically associated with reduction regions, which may be located a certain distance away. Consequently, localized damage occurs that has major consequences on the ferrous metal.

Anti-corrosion protection for buried pipe elements is therefore especially difficult, and all the more so when the soils are of different kinds, while the pipe members may be used in different ways, carrying fluids at different temperatures, which changes the corrosion conditions, while at the same time the pipe members may frequently be damaged at various points on their outer surface when they are handled pursuant to transport and installation.

SUMMARY OF THE INVENTION

An object of this invention is to provide a coating technique for a buried iron pipe member with an acceptable cost, appropriate to any pipe utilization, particularly in water supply and sewage, and in the vast majority of soils. This object is fulfilled by providing an iron pipe member, particularly in cast iron for buried piping, with an external coating including:

a first porous coating of zinc-aluminum alloy containing 5% to 60% of aluminum; and, on the first coat, a second porous or thereafter "pore-sealing" coating based on an organic or mineral binder, in aqueous, solvent, or powder phase. According to other characteristics:

the organic binder is a bitumen varnish, coal pitch, or a synthetic organic product;

the synthetic organic product is an epoxy resin;

the pore-sealing coating is a water-based paint;

the pore-sealing coating has a thickness of between 100 and 140 μm;

the alloy coating is applied with a surface density of at least 200 g/m$^2$; and/or the coating system further includes a coat of zinc chromate and/or zinc phosphate between the first and second coats.

Further objects of the invention include:

1) a buried piping or conduit system consisting of pipe members as defined above;

2) a coating in conformity with the coating system defined above, obtained by at least the following steps:
   a) electric arc-spray depositing a first coat of zinc-aluminum alloy containing 5% to 60% aluminum; and then,
   b) depositing a second pore-sealing layer to protect the iron pipe member, particularly one of cast iron, against soil corrosion; and 3) a process for protecting a cast iron pipe member against soil corrosion, including the following steps:
   a) arc-spray depositing a first zinc-aluminum alloy coating containing 5% to 60% aluminum; and
   b) depositing a second pore-sealing coating.

DETAILED DESCRIPTION OF THE PREFERRED EMBODIMENTS

An example will now be given of the application of the invention to a water supply or drainage pipe member made of ductile iron.

In this example, the coating defined above is applied to the cast iron as it comes out of its heat treatment furnace, with a skin of iron oxides. The first step consists in depositing a first coating of zinc-aluminum alloy containing 5% to 60% of aluminum, and preferably 10% to 60% of aluminum, by electric arc-spraying.

Under the effect of corrosive soil agents, this coating is transformed into a protective coating of stable corrosion products in the medium in which it occurs. The alloy coating is furthermore "sacrificial" with respect to the cast iron, in the sense that it may gradually be consumed by oxidation under the effect of the electrochemical battery formed by the cast iron, the alloy, and the soil, to protect the underlying cast iron or any cast iron that is bared by defects in the zinc-aluminum, by forming this protective coating.

Since this first coating is deposited by arc spraying, it consists of solidified droplets and is therefore porous. By appropriate choice of the pore size and coating thickness, the conditions and particularly the rate at which the protective coating forms can be controlled. It has been observed that the two-phase structure of the zinc-aluminum alloy promotes the trapping of the zinc corrosion products. It has been determined that the first coating should preferably be deposited with a density of at least 200 g/m$^2$.

The pore-sealing finishing coat is then deposited by spraying. This pore sealant slows down the corrosion of the zinc and consolidates the layer of zinc corrosion products, to maintain their protective effect. The pore sealant must be thick enough to ensure this restraint, but thin enough for the pore sealant to remain porous, or else the active chemical species would no longer be able to migrate to the first layer of the coating, in order for this layer to play its specific role as explained above. Moreover, too great a thickness of the pore sealant would lead to the trapping of water under the sealant and the formation of blisters. It has been determined that the pore sealant thickness should be between 100 and 140 μm.

The pore sealant has an organic or mineral binder base in aqueous, solvent, or powder phase. The organic binder may be a bitumen varnish, coal pitch, or a synthetic organic product. In the latter case, an epoxy resin is preferred. As a variant, the pore sealant coating is a water-based paint.

After the first coating is deposited, and before the second, the zinc-aluminum surface can be treated by chromating or phosphating for surface conversion. This treatment consists in applying a single or dual-component chromating or phosphating base product to the zinc-aluminum alloy.

As an example, a cast iron pipe taken directly from its heat treatment furnace was coated as follows:

a zinc-aluminum alloy coating of 85% zinc and 15% aluminum was deposited at a surface density of 200 g/m$^2$;

a 15 μm thickness (dry) of surface conversion product composed essentially of zinc chromate, polyvinyl butyryl, and phosphoric acid was then deposited with a paint spray gun operating with or without compressed air; and a 120 μm dry thickness of epoxy resin pore-sealing coating was deposited by a paint spray gun, operating with or without compressed air.

We claim:

1. An iron pipe member for a piping system buried in the earth, provided with an external coating for galvanic protection against soil corrosion, said coating comprising:

a) a porous inner coat of zinc-aluminum alloy containing 5% to 60% of aluminum applied directly to an outer surface of the pipe member; and b) a porous outer pore-sealing coat of one of an organic and mineral binder in one of an aqueous, solvent, and powder phase, and having a thickness between 100 and 140 μm applied over the inner coat.

2. An iron pipe member as recited in claim 1, wherein said member is made of cast iron.

3. A pipe member as recited in claim 2, wherein the organic binder is one of a bitumen varnish, a coal pitch, and a synthetic organic product.

4. A pipe member as recited in claim 3, wherein the synthetic organic product is an epoxy resin.

5. A pipe member as recited in claim 2, wherein the pore-sealing coat is a water-based paint.

6. A pipe member as recited in claim 2, wherein the alloy coat has a density of at least 200 $g/m^2$.

7. A pipe member as recited in claim 2, further comprising an intermediate coat of at least one of zinc chromate and zinc phosphate between the inner and outer coats.

8. An iron pipe member as recited in claim 2, wherein the alloy coat is deposited by electric-arc spraying.

9. An iron pipe member as recited in claim 8, wherein the outer coat is deposited by spraying.

10. A method for protecting an iron pipe member for galvanically a buried piping system against soil corrosion, comprising the steps of:

a) applying a porous inner coat of zinc-aluminum alloy containing 5% to 60% of aluminum directly to an outer surface of the pipe member, and b) applying a porous outer pore-sealing coat of one of an organic and mineral binder in one of an aqueous, solvent, and powder phase, and having a thickness between 100 and 140 μm over the inner coat.

11. A method as recited in claim 10, wherein the pipe member is made of cast iron.

12. A method as recited in claim 11, wherein the organic binder is one of a bitumen varnish, a coal pitch, and a synthetic organic product.

13. A method as recited in claim 12, wherein the synthetic organic product is an epoxy resin.

14. A method as recited in claim 11, wherein the pore-sealing coat is a water-based paint.

15. A method as recited in claim 11, wherein the alloy coat has a density of at least 200 $g/m^2$.

16. A method as recited in claim 11, further comprising the step of applying an intermediate coat of at least one of zinc chromate and zinc phosphate between the inner and outer coats.

17. A method as recited in claim 11, wherein the alloy coat is deposited by electric-arc spraying, and the outer coat is deposited by spraying.

\* \* \* \* \*